United States Patent
Sun et al.

(10) Patent No.: US 10,640,847 B2
(45) Date of Patent: May 5, 2020

(54) RECOVERY OF RARE EARTHS FROM CONCENTRATES CONTAINING FLUORINE

(71) Applicant: HAZEN RESEARCH, INC., Golden, CO (US)

(72) Inventors: Kang Sun, Arvada, CO (US); David R. Baughman, Golden, CO (US); Wayne W. Hazen, Lakewood, CO (US)

(73) Assignee: Hazen Research, Inc., Golden, CO (US)

( * ) Notice: Subject to any disclaimer, the term of this patent is extended or adjusted under 35 U.S.C. 154(b) by 0 days.

(21) Appl. No.: 15/746,321

(22) PCT Filed: Jul. 21, 2016

(86) PCT No.: PCT/US2016/043270
§ 371 (c)(1),
(2) Date: Jan. 19, 2018

(87) PCT Pub. No.: WO2017/015435
PCT Pub. Date: Jan. 26, 2017

(65) Prior Publication Data
US 2018/0209015 A1  Jul. 26, 2018

Related U.S. Application Data
(60) Provisional application No. 62/195,154, filed on Jul. 21, 2015.

(51) Int. Cl.
| | | |
|---|---|---|
| *C22B 59/00* | (2006.01) | |
| *C22B 3/10* | (2006.01) | |
| *C22B 34/14* | (2006.01) | |
| *C22B 34/24* | (2006.01) | |
| *C01F 17/00* | (2020.01) | |
| *C01G 23/02* | (2006.01) | |
| *C22B 1/08* | (2006.01) | |
| *C01F 5/32* | (2006.01) | |
| *C22B 34/12* | (2006.01) | |
| *C01G 25/02* | (2006.01) | |
| *C01G 23/04* | (2006.01) | |
| *C01G 25/04* | (2006.01) | |
| *C22B 1/16* | (2006.01) | |

(52) U.S. Cl.
CPC ................ *C22B 59/00* (2013.01); *C01F 5/32* (2013.01); *C01F 17/0043* (2013.01); *C01F 17/0068* (2013.01); *C01G 23/02* (2013.01); *C01G 23/04* (2013.01); *C01G 25/02* (2013.01); *C01G 25/04* (2013.01); *C22B 1/08* (2013.01); *C22B 1/16* (2013.01); *C22B 3/10* (2013.01); *C22B 34/12* (2013.01); *C22B 34/1245* (2013.01); *C22B 34/14* (2013.01); *C22B 34/24* (2013.01); *Y02P 10/234* (2015.11)

(58) Field of Classification Search
CPC ...... C01F 17/00; C01F 17/0068; C01G 23/02; C22B 1/14; C22B 34/1245; C22B 34/14; C22B 34/24; C22B 59/00
USPC ...................... 423/21.1, 65, 68, 82
See application file for complete search history.

(56) References Cited

U.S. PATENT DOCUMENTS

| | | | | |
|---|---|---|---|---|
| 2,578,748 | A * | 12/1951 | Schoenlaub | C01G 25/02 423/82 |
| 2,952,513 | A * | 9/1960 | Wigton | C01B 33/08 423/343 |
| 3,353,928 | A * | 11/1967 | Woyski | C01F 17/0068 423/19 |
| 5,039,336 | A * | 8/1991 | Feuling | C01F 17/0006 423/21.1 |
| 5,188,809 | A * | 2/1993 | Crocker | B03D 1/02 209/164 |
| 5,569,440 | A * | 10/1996 | Sommers | C01G 25/04 423/492 |
| 2008/0105536 | A1* | 5/2008 | Auner | B01J 19/126 204/157.43 |
| 2009/0185965 | A1* | 7/2009 | Delons | B01J 41/04 423/70 |
| 2014/0373683 | A1* | 12/2014 | Boudreault | C22B 3/0005 75/743 |

OTHER PUBLICATIONS

International Search Report for International Patent Application No. PCT/US2016/043270, dated Sep. 27, 2016, 3 pages.
Written Opinion for International Patent Application No. PCT/US2016/043270, dated Sep. 2016, 4 pages.

* cited by examiner

*Primary Examiner* — Steven J Bos
(74) *Attorney, Agent, or Firm* — Sheridan Ross P.C.

(57) ABSTRACT

The present invention relates to the recovery of rare earths, scandium, niobium, tantalum, zirconium, hafnium, titanium, and the like from ores or concentrates containing fluorine. More specifically, the ores or concentrates are pretreated by carbochlorination to convert the rare earths and other metals into their chlorides and then subjected to dilute hydrochloric acid leaching to recover the valuable rare earths and other metals from the leachate. Niobium, tantalum, zirconium, hafnium, and titanium can be recovered as their chlorides or oxychlorides from the gaseous products of carbochlorination, or converted into their oxides while simultaneously regenerating chlorine.

21 Claims, 1 Drawing Sheet

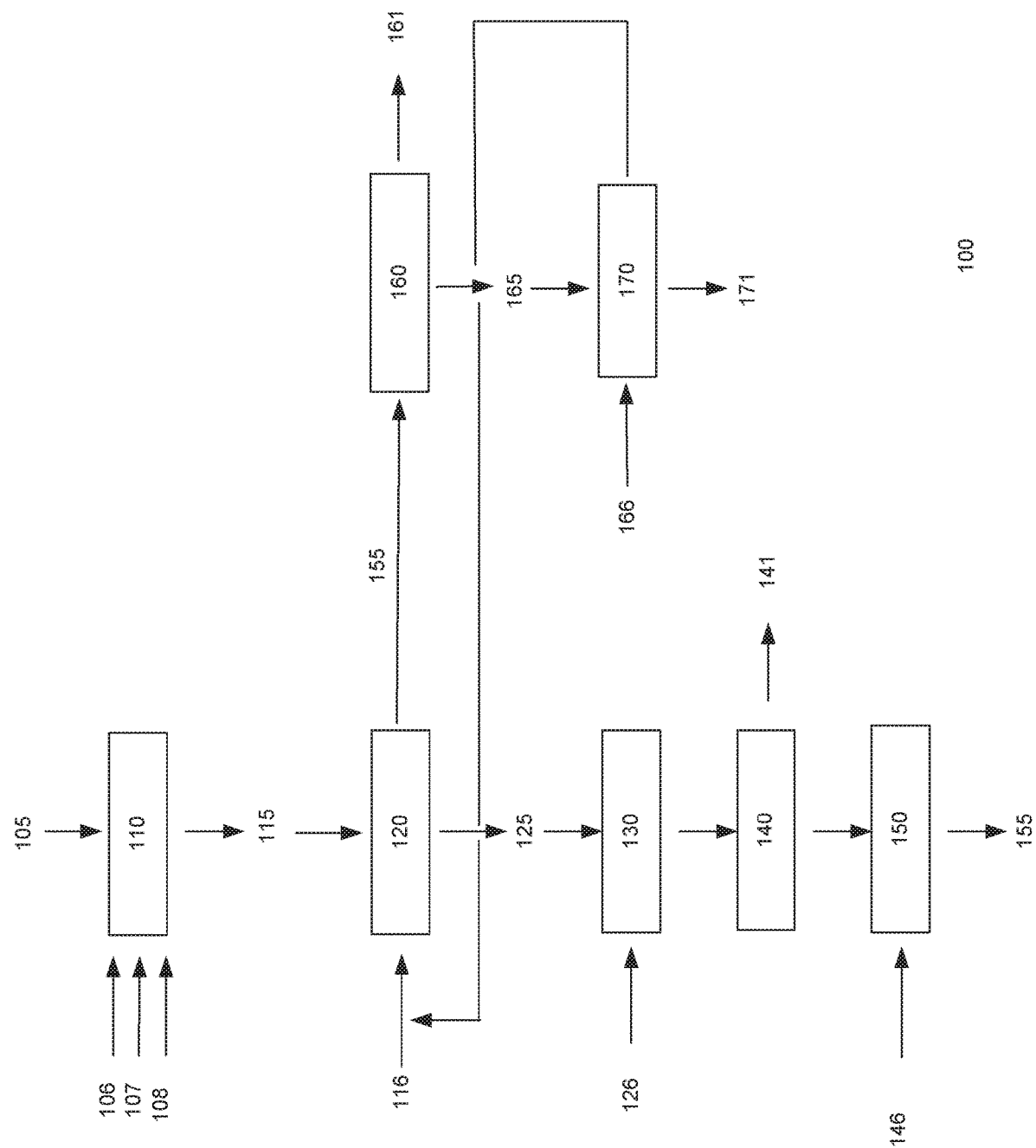

RECOVERY OF RARE EARTHS FROM CONCENTRATES CONTAINING FLUORINE

CROSS REFERENCE TO RELATED APPLICATIONS

This application is a national stage application under 35 U.S.C. 371 of PCT Application No. PCT/US2016/043270 having an international filing date of Jul. 21, 2016, which designated the United States, which PCT application claimed the benefit of U.S. Provisional Patent Application No. 62/195,154, filed Jul. 21, 2015, both of which are incorporated herein by reference.

FIELD OF THE INVENTION

The present invention relates to the recovery of valuable metals from raw ores or concentrates, and more specifically to the recovery of rare earths, scandium, niobium, tantalum, zirconium, hafnium, titanium, and the like from ores or concentrates containing fluorine.

BACKGROUND OF THE PRESENT INVENTION

Conventional techniques for extracting rare earths from monazite and bastnasite include caustic soda decomposition and sulfuric acid roasting. In caustic soda decomposition, after pretreatment with NaOH, rare earths are converted into rare earth trihydroxides ($RE(OH)_3$), which can be leached with mineral acids to solubilize the rare earths into a leachate; this process requires large amounts of NaOH and increases the difficulty of subsequent processing steps. In sulfuric acid roasting, the roasted rare earth concentrate with $H_2SO_4$ is leached with water to recover rare earths into a leachate and separated from the gangue components; although a fraction of the fluorine can be removed from the gas stream, rare earths are difficult to recover from the aqueous leachate due to the interaction of rare earths with the remaining fluorine. If the fluorine-containing ore or concentrate is treated with the technique of sulfuric acid roasting, although a fraction of the fluorine can be removed from the gas stream, rare earths are difficult to sufficiently recover from the aqueous leachate due to the interaction of rare earths with the remaining fluorine.

It has been proved experimentally that the removal of fluorine by mineral processing techniques is very difficult. Moreover, rare earth ores or concentrates may also contain other metals of interest, such as, by way of non-limiting example, niobium, tantalum, zirconium, hafnium, and titanium, which are not effectively recovered and separated by caustic soda decomposition or sulfuric acid roasting.

Chlorination is a suitable technique for processing ores or concentrates that contain both rare earths and other metals of interest. One of the most straightforward processes known in the art for recovering rare earths and the like from raw ores or concentrates may be termed "direct" carbochlorination, i.e. carbochlorination of the ore or concentrate without any additives or pretreatments. In direct carbochlorination, rare earths are converted into their chlorides and enriched in a solid or molten calcine, while other metals of interest form volatile chlorides in a gaseous phase; for ores or concentrates with low concentrations of rare earths, the carbochlorination calcine is then leached, and the rare earth chlorides can be recovered, separated, and purified in subsequent hydrometallurgical treatment of the leachate.

The following four references generally relate to direct carbochlorination processes and are incorporated herein by reference in their entireties:

F. R. Hartley, "The preparation of anhydrous lanthanon chlorides by high-temperature chlorination of monazite," 2(1) *Journal of Applied Chemistry* 24 (January 1952).

A. W. Henderson et al., "Chlorination of euxenite concentrates," 50(4) *Industrial & Engineering Chemistry* 611 (April 1958).

O. M. Hilal and F. A. El Gohary, "Chlorination of monazite," 53(12) *Industrial & Engineering Chemistry* 997 (December 1961).

W. Brugger and E. Greinacher, "A process for direct chlorination of rare earth ores at high temperatures on a production scale," 19(12) *Journal of Metals* 32 (December 1967).

However, to effectively recover rare earths from the carbochlorination calcine with dilute hydrochloric acid leaching, all of the rare earths should be in the state of their chlorides, and the formation of rare earth fluorides must be avoided because rare earth fluorides are insoluble in dilute hydrochloric acid. Thermodynamically, the rare earth fluorides are more stable than their chlorides, and when there is fluorine in the ore or concentrate, the formation of rare earth fluorides during direct carbochlorination is thus unavoidable. As a result, the rare earths mainly remain in the solid residue after leaching the chlorinated materials, and so recovery of rare earths from the leachate after direct carbochlorination is not feasible when the ore or concentrate contains appreciable fluorine content.

In addition, in the techniques disclosed in the prior art, such as U.S. Pat. No. 3,353,928 to Woyski et al. ("Woyski," the entirety of which is incorporated herein by reference), it is necessary to remove fluorine from the system by forming volatile fluorides.

There is thus a need for a method of recovering rare earths and the like, which retains the benefits of direct carbochlorination but results in high yields of the rare earths from raw ores or concentrates which contain fluorine. There is a further need for such methods that do not require the complete removal of fluorine from the system.

BRIEF SUMMARY OF CERTAIN EMBODIMENTS OF THE INVENTION

It is one aspect of embodiments of the present invention to provide a method of recovering a mineral selected from the group consisting of a rare earth mineral, a scandium mineral, a niobium mineral, a tantalum mineral, a zirconium mineral, a hafnium mineral, a titanium mineral, and combinations thereof from an ore or concentrate, comprising treating the ore or concentrate by carbochlorination in the presence of a carbon-containing material and a fluorine capturing agent (FCA) to form a mineral chloride; contacting the treated ore or concentrate with a dilute hydrochloric acid leach solution to solubilize the mineral chloride in the leach solution; and recovering the mineral.

In some embodiments, the fluorine capturing agent comprises at least one of magnesium chloride, silicon tetrachloride, and mixtures thereof, or any substances which form fluorides more thermodynamically stable than rare earth fluorides during carbochlorination, provided that they or their derivatives do not interfere with the carbochlorination of the ore or concentrate and the recovery of the formed rare earth chlorides. In certain embodiments, the fluorine capturing agent may be formed in situ during the treating step by carbochlorination of a precursor. By way of non-limiting example, silicon tetrachloride may be formed in situ during the treating step by carbochlorination of silicon dioxide or silicates, or magnesium chloride may be formed in situ during the treating step by carbochlorination of at least one of magnesium oxide, magnesium hydroxide, and magnesium carbonate.

In some embodiments, the ore or concentrate comprises at least one of monazite, bastnasite, pyrochlore, zircon, ilmenite, rutile, loparite, columbite, tantalite, and fluorine- and rare earths-containing industrial solid waste.

In some embodiments, a weight ratio of the ore or concentrate to the carbon-containing material is less than about 5:1.

In some embodiments, the treating step is performed for a time of between about two hours and about four hours.

In some embodiments, the treating step is performed at a temperature of between about 600° C. and about 1000° C.

In some embodiments, the mineral is recovered from the leach solution. In certain embodiments, the mineral is at least one of a rare earth mineral and a scandium mineral.

In some embodiments, the mineral is recovered from a gas phase. In certain embodiments, the mineral is at least one of a niobium mineral, a tantalum mineral, a zirconium mineral, a hafnium mineral, and a titanium mineral.

In some embodiments, the carbon-containing material comprises at least one of coke, coal, biomass, and an organic compound.

It is another aspect of embodiments of the present invention to provide a method of recovering a mineral comprising at least one of scandium, niobium, tantalum, zirconium, hafnium, titanium, and a rare earth element from an ore or concentrate comprising fluorine, comprising agglomerating the ore or concentrate with a carbon-containing material, a fluorine capturing agent, and a binder to produce an agglomerate; carbochlorinating the agglomerate by exposing the agglomerate to chlorine gas to produce a calcine; leaching the calcine by contacting the calcine with a dilute hydrochloric acid solution having a pH of less than about 4.0 to produce a liquid/solid mixture; and recovering the mineral by contacting the liquid from the liquid/solid mixture with at least one of sodium hydroxide, ammonium hydroxide and magnesium hydroxide.

In some embodiments, the carbochlorinating step produces a gas and the method further comprises condensing the gas to produce at least one of condensed chlorides and oxychlorides and regenerating chlorine gas by exposing the at least one of chlorides and oxychlorides to an oxygen-containing gas. In certain embodiments, the chlorine gas regenerated in the regenerating step is at least part of the chlorine gas to which the agglomerate is exposed in the carbochlorinating step.

In some embodiments, the fluorine capturing agent comprises at least one of magnesium chloride, silicon tetrachloride, and mixtures thereof, or any substances which form fluorides more stable than rare earth fluorides during carbochlorination, provided that they or their derivatives do not interfere with the carbochlorination of the ore or concentrate and the recovery of the formed rare earth chlorides. In certain embodiments, the fluorine capturing agent may be formed in situ during the treating step by carbochlorination of a precursor. By way of non-limiting example, silicon tetrachloride may be formed in situ during the treating step by carbochlorination of silicon dioxide or silicates, or magnesium chloride may be formed in situ during the treating step by carbochlorination of at least one of magnesium oxide, magnesium hydroxide, and magnesium carbonate.

In some embodiments, the ore or concentrate comprises at least one of monazite, bastnasite, pyrochlore, zircon, ilmenite, rutile, loparite, columbite, tantalite, and fluorine- and rare earths-containing industrial solid waste.

In some embodiments, a weight ratio of the ore or concentrate to the carbon-containing material is less than about 5:1.

In some embodiments, the treating step is performed for a time of between about two hours and about four hours.

In some embodiments, the treating step is performed at a temperature of between about 600° C. and about 1000° C.

In some embodiments, the carbon-containing material comprises at least one of coke, coal, biomass, and an organic compound.

Various embodiments of the present invention are directed to recovering rare earths from high-fluorine ores or concentrates by carbochlorination of the ores or concentrates in the presence of a fluorine capturing agent, followed by dilute hydrochloric acid leaching of the carbochlorination calcines. Formation of the insoluble rare earth fluorides during the carbochlorination of the high-fluorine ores or concentrates is efficiently avoided by introducing the fluorine capturing agent into the carbochlorination step. Suitable fluorine capturing agents include cheap and easily available chemicals, such as, by way of non-limiting example, magnesium chloride, silicon tetrachloride, and mixtures thereof, or any substances which form fluorides more thermodynamically stable than rare earth fluorides, provided that they or their derivatives do not interfere with the carbochlorination of the ore or concentrate and the recovery of the formed rare earth chlorides. The carbon-containing material both acts as the reductant and can adjust the permeability of the reaction bed if molten salts form. After carbochlorination of the ore or concentrate in the presence of the fluorine capturing agent, the calcine can be leached with dilute hydrochloric acid and a very high yield of rare earths can be recovered from the leachate.

In embodiments of the present invention, unlike the techniques disclosed in, e.g., Woyski, because a great portion of the fluorine in rare earth concentrates containing more than about 25 wt % fluorine is in the state of calcium fluoride, it is not necessary to remove the fluorine from the system by forming volatile fluorides. The present invention eliminates this necessity by preventing the formation of rare earth fluorides and converting the preexisting rare earth fluorides into rare earth chlorides. Any fluorides remaining in the carbochlorination calcine are essentially insoluble in the subsequent dilute hydrochloric acid leach solution.

While specific embodiments and applications of the present invention have been illustrated and described, it is to be understood that the invention is not limited to the precise configuration and components described herein. Various modifications, changes, and variations which will be apparent to those skilled in the art may be made in the arrangement, operation, and details of the methods and systems of the present invention disclosed herein without departing from the spirit and scope of the invention. It is important, therefore, that the claims be regarded as including any such equivalent construction insofar as they do not depart from the spirit and scope of the present invention.

The advantages of the present invention will be apparent from the disclosure contained herein.

As used herein, "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

It is to be noted that the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The embodiments and configurations described herein are neither complete nor exhaustive. As will be appreciated, other embodiments of the invention are possible utilizing, alone or in combination, one or more of the features set forth above or described in detail below.

BRIEF DESCRIPTION OF THE DRAWING

FIG. 1 is a flowsheet of a process for recovering rare earths and other valuable metals from raw ores or concentrates, according to embodiments of the present invention.

DETAILED DESCRIPTION OF CERTAIN EMBODIMENTS OF THE INVENTION

Unless defined otherwise, all technical and scientific terms used herein have the same meaning as is commonly understood by one of ordinary skill in the art. All patents, applications, published applications, and other publications to which reference is made herein are incorporated by reference in their entirety. In the event that there is a plurality of definitions for a term herein, the definition provided in the Brief Summary of Certain Embodiments of the Invention prevails unless otherwise stated.

As used herein, the term "rare earth element" (REE) refers to any one or more of yttrium, lanthanum, cerium, praseodymium, neodymium, samarium, europium, gadolinium, terbium, dysprosium, holmium, erbium, thulium, ytterbium, and lutetium.

As used herein, the term "light rare earth element" (LREE) refers to any one or more of lanthanum, cerium, praseodymium, neodymium, and samarium.

As used herein, the term "heavy rare earth element" (HREE) refers to any one or more of yttrium, europium, gadolinium, terbium, dysprosium, holmium, erbium, thulium, ytterbium, and lutetium.

Referring now to FIG. 1, one embodiment of a process 100 for recovering rare earths and other valuable metals from raw ores or concentrates is illustrated. In process 100, an ore or concentrate 105 is combined with coke 106, a fluorine capturing agent 107, and a binder 108 in agglomeration step 110. Agglomeration step 110 produces an agglomerate 115 in the form of, by way of non-limiting example, pellets or briquettes. The agglomerate 115 is then combined with chlorine gas 116 in carbochlorination step 120. Carbochlorination step 120 produces a calcine 125 and a gas 155, which may be condensed in condensation step 160. Condensation step 160 produces an off gas 161, which is purged, and condensed chlorides and/or oxychlorides 165, which may be combined with oxygen gas 166 in chlorine regeneration step 170. Chlorine regeneration step 170 produces oxides 171 and chlorine gas, which may be recycled to carbochlorination step 120 as part of chlorine gas 116. Calcine 125 is combined with an HCl solution 126 in leach step 130; the HCl solution 126 may preferably have a pH of about 1.0. The leachate resulting from leach step 130 is subjected to liquid/solid separation step 140. Liquid/solid separation step 140 produces solids 141, which are disposed, and liquids, which are combined with a hydroxide 146 in rare earth recovery step 150; the hydroxide may, by way of non-limiting example, be one of sodium hydroxide, ammonium hydroxide, and magnesium hydroxide. Rare earth recovery step 150 results in recovery of rare earth products 155, which may, by way of non-limiting example, be rare earth hydroxides.

To recover valuable rare earths and the like by leaching a carbochlorination calcine with dilute hydrochloric acid, and in particular to avoid the formation of rare earth fluorides, any rare earth fluorides present are converted to rare earth chlorides, and the formation of new rare earth fluorides via the metathesis reactions between rare earth chlorides and other fluorides are prevented.

Thermodynamically, any compounds whose reaction products with the fluorine compounds present in the ore or concentrate (most commonly calcium fluoride) are more stable than the reaction products between the fluorine compounds and rare earth chlorides can prevent the formation of rare earth fluorides and thus serve as a fluorine capturing agent. According to the present invention, recovery of rare earths from fluorine-containing ores or concentrates does not necessitate complete removal of fluorine from the system by forming volatile fluorides; instead, the formation of rare earth fluorides during carbochlorination is prevented by the introduction of an FCA. The chlorides of some light elements in groups 2, 13, 14 and 15 of the periodic table are capable of preventing the formation of rare earth fluorides from rare earth chlorides. The FCA preferably comprises silicon tetrachloride and/or magnesium chloride, which, at 650° C. and under standard conditions, can prevent the conversion of the chlorides of all rare earths, except yttrium, dysprosium, and lutetium, into their corresponding fluorides during the carbochlorination of ores or concentrates containing fluorine. When silicon tetrachloride is used as the FCA, the partial pressure of silicon tetrachloride must be high enough to prevent reaction between the newly formed rare earth chlorides and, e.g., calcium fluoride, and meanwhile to convert any preexisting rare earth fluorides into rare earth chlorides. If magnesium chloride is used as the FCA, because the mechanism is to combine fluorine with magnesium to form the more stable magnesium fluoride, enough activity of magnesium chloride is needed to prevent the formation of rare earth fluorides. Magnesium fluoride has a melting point of 1263° C. and thus may be in solid form at the carbochlorination temperature or may at least partially dissolve in molten salts, such as calcium chloride, rare earth chlorides, sodium chloride, or magnesium chloride.

If sufficient calcium fluoride remains in the system, some FCA, e.g. silicon tetrachloride or magnesium chloride, is needed to prevent post-chlorination reactions at high temperature, even if the carbochlorination reactions of rare earths approach completeness. Specifically, the calcine should be cooled under chlorine gas, e.g. in the presence of sufficient silicon dioxide or magnesium oxide to form the silicon tetrachloride or magnesium chloride as the FCA, at least until the calcine temperature is below about 400° C.

Thus, there should be sufficient partial pressure or activity of the FCA in the reaction system to prevent the formation of rare earth fluorides and convert any preexisting rare earth fluorides into rare earth chlorides. In addition, compared to light rare earth elements, the heavy rare earth elements, except thulium and ytterbium, are more likely to form fluorides; under standard conditions at 650° C., thulium and ytterbium form chlorides that do not spontaneously react with light rare earth fluorides. Thus, the recovery of the heavy rare earths is generally lower than that of the light rare earths. Accordingly, to achieve high yields of the heavy rare earths, the FCA should, in embodiments, generally be present in greater than stoichiometric amounts.

The FCA may be provided at the outset of the process, or it may be formed in situ by carbochlorination of a corresponding compound. By way of non-limiting example, silicon tetrachloride may be formed in situ by carbochlorination of silicon dioxide or silicates, or magnesium chloride may be formed in situ by carbochlorination of at least one of magnesium oxide, magnesium hydroxide, and magnesium carbonate. In some embodiments, in situ formation of the FCA may be more attractive from an economic viewpoint.

The following disclosed Examples are presented for purposes of illustration and description and are not to be construed as limiting the invention to any particular form or forms disclosed herein.

Example 1

Carbochlorination experiments were conducted with an electric furnace. Mixtures of concentrate and petroleum coke were held in a graphite boat (11½"×1¼"×7/16") which were then put into a quartz reactor (50 mm (Φ)×85 cm). The materials were heated to a predetermined temperature under inert gas (argon). Carbochlorination was then conducted isothermally by purging the argon and introducing chlorine gas. After a predetermined reaction period, the reacted materials were cooled to 400° C. under chlorine gas, and then cooled to room temperature under argon.

Three kinds of rare earth concentrates were used in the Examples. Concentrates I and II are characterized by their high fluorine content. Concentrate III is characterized by a complex mineral composition, including monazite, allanite, synchysite, bastnasite, zircon and fergusonite. Tables 1, 2, and 3 list the compositions of Concentrates I, II, and III, respectively.

TABLE 1

Chemical composition of Concentrate I

| Element | | | | | | | | | | | | | | | | |
|---|---|---|---|---|---|---|---|---|---|---|---|---|---|---|---|---|
| | C | F | Be | Na | Mg | Al | Si | P | K | Ca | Sc | Ti | Mn | Fe | Y | Zr |
| Content, wt % | 3.62 | 25.1 | <0.01 | <0.01 | 2.58 | 0.04 | 0.21 | 2.75 | 0.01 | 32.8 | 0.002 | 0.07 | 0.397 | 2.89 | 0.120 | 0.007 |

| Element | | | | | | | | | | | | | | | | |
|---|---|---|---|---|---|---|---|---|---|---|---|---|---|---|---|---|
| | Nb | La | Ce | Pr | Nd | Sm | Eu | Gd | Tb | Dy | Ho | Er | Tm | Yb | Lu | Th |
| Content, wt % | 0.04 | 2.26 | 4.15 | 0.431 | 1.36 | 0.160 | 0.045 | 0.094 | 0.006 | 0.041 | 0.004 | 0.005 | <0.001 | 0.004 | a | 0.18 | a Did not analyze.

TABLE 2

Chemical composition of Concentrate II

| Element | | | | | | | | | | | |
|---|---|---|---|---|---|---|---|---|---|---|---|
| | Be | F | Na | Mg | Al | Si | P | K | Ca | Sc | Ti |
| Content, wt % | 0.001 | 26.3 | 0.02 | 1.17 | 0.03 | 0.16 | 3.23 | 0.20 | 30.1 | 0.003 | 0.165 |

| Element | | | | | | | | |
|---|---|---|---|---|---|---|---|---|
| | V | Mn | Fe | Zn | Ga | As | Sr | Y | Zr |
| Content, wt % | 0.006 | 0.283 | 3.41 | 0.751 | 0.037 | 0.018 | 0.260 | 0.132 | 0.007 |

| Element | | | | | | | | | | |
|---|---|---|---|---|---|---|---|---|---|---|
| | Nb | Sn | Ba | La | Ce | Pr | Nd | Sm | Eu | Gd | Tb |
| Content, wt % | 0.074 | 0.002 | 0.188 | 3.53 | 6.29 | 0.620 | 2.10 | 0.256 | 0.056 | 0.128 | 0.012 |

| Element | | | | | | | | |
|---|---|---|---|---|---|---|---|---|
| | Dy | Ho | Er | Tm | Yb | Lu | Pb | Th | U |
| Content, wt % | 0.045 | 0.005 | 0.010 | 0.001 | 0.005 | 0.0006 | 0.094 | 0.227 | 0.0001 |

TABLE 3

Chemical composition of Concentrate III

| | F | Na | Mg | Al | Si | P | K | Ca | Ti | Cr | Mn |
|---|---|---|---|---|---|---|---|---|---|---|---|
| Content, (wt %) | 2.81 | 0.200 | 1.27 | 1.63 | 12.2 | 0.620 | 1.10 | 7.39 | 0.083 | 0.019 | 0.422 |

| | Fe | Zn | Ga | As | Sr | Y | Zr | Nb | Ag | Sn |
|---|---|---|---|---|---|---|---|---|---|---|
| Content, (wt %) | 10.0 | 0.027 | 0.023 | 0.013 | 0.014 | 0.915 | 13.6 | 1.25 | 0.042 | 0.024 |

| | Ba | La | Ce | Pr | Nd | Sm | Eu | Gd | Tb | Dy | Ho |
|---|---|---|---|---|---|---|---|---|---|---|---|
| Content, (wt %) | 0.031 | 1.12 | 2.46 | 0.318 | 1.32 | 0.305 | 0.037 | 0.270 | 0.043 | 0.237 | 0.041 |

| | Er | Tm | Yb | Lu | Hf | Ta | Pb | Th | U |
|---|---|---|---|---|---|---|---|---|---|
| Content, (wt %) | 0.104 | 0.013 | 0.079 | 0.010 | 0.233 | 0.121 | 0.014 | 0.077 | 0.012 |

Petroleum coke with the composition listed in Table 4 was used as the carbonaceous reductant.

TABLE 4

Composition of petroleum coke

| Proximate composition, wt % | | | Impurity content, wt % | | | | | | |
|---|---|---|---|---|---|---|---|---|---|
| Ash | Vola-tile | Fixed C | Al | Si | Fe | Ca | Mg | Na | K |
| 0.91 | 7.07 | 92.0 | 0.068 | <0.01 | 0.029 | 0.026 | 0.003 | 0.013 | 0.004 |

After cooling to room temperature, the carbochlorination calcines were leached with a dilute HCl aqueous solution under ambient conditions, and the filter cakes were then washed three times under the same conditions. The solid residues were dried at 110° C. for at least more than 4 hours. Recovery of rare earths from the leachate was calculated based on the dried solid residue because some rare earth elements were present below detectable limits in the liquid samples.

Unless otherwise specified, experimental conditions were as summarized in Table

TABLE 5

| Experimental conditions | Value |
|---|---|
| Carbochlorination condition | |
| Amount of concentrate, g | 25 |
| Amount of petroleum coke, g | 40 |
| $Cl_2$ flow rate, sml/min | 200 |
| Reaction temperature, ° C. | 650 |
| Heating rate, ° C./min | 8 |
| Pressure, in. $H_2O$ | 3 |
| Retention time at temperature, h | 2 |
| Leaching or washing condition | |
| Initial pulp density, wt % solid | 14-15 |
| Concentration of dilute HCl solution, M | 0.5 |
| Stirring speed, rpm | 400-450 |
| Temperature, ° C. | Ambient |
| Pressure, atm | Ambient |
| Retention time, min | 30 |

Table 6 summarizes the results of direct carbochlorination of Concentrate I in the absence of any FCA. In the experiment summarized in Table 6, the amount of petroleum coke was 5 g, the carbochlorination temperature was 700° C., the reaction time was 4 hours, the amount of calcine after carbochlorination was 29.34 g, and the amount of dried solid residue after aqueous leaching of the calcine with dilute HCl solution was 11.88 g.

TABLE 6

Experimental results of the recovery of rare earths from leachate

| Rare earths | Y | La | Ce | Pr | Nd | Sm | Eu | Gd | Tb | Dy | Ho | Er | Tm | Yb | Lu |
|---|---|---|---|---|---|---|---|---|---|---|---|---|---|---|---|
| Content in concentrate, wt % | 0.120 | 2.26 | 4.15 | 0.431 | 1.36 | 0.16 | 0.045 | 0.094 | 0.006 | 0.041 | 0.004 | 0.005 | 0.001 | 0.004 | a |
| Content in residue, wt % | 0.234 | 4.08 | 7.50 | 0.753 | 2.59 | 0.323 | 0.083 | 0.185 | 0.014 | 0.078 | 0.009 | 0.011 | <0.002 | 0.007 | a |
| Amount | $W_{concentrate}$ = 25 g, $W_{residue}$ = 11.88 g | | | | | | | | | | | | | | |
| Amount in feed material, g | 0.030 | 0.565 | 1.04 | 0.108 | 0.340 | 0.040 | 0.011 | 0.024 | 0.002 | 0.010 | 0.001 | 0.001 | 0.0003 | 0.001 | |

TABLE 6-continued

Experimental results of the recovery of rare earths from leachate

| Rare earths | Y | La | Ce | Pr | Nd | Sm | Eu | Gd | Tb | Dy | Ho | Er | Tm | Yb | Lu |
|---|---|---|---|---|---|---|---|---|---|---|---|---|---|---|---|
| Amount in solid residue, g | 0.0278 | 0.485 | 0.891 | 0.0895 | 0.308 | 0.0384 | 0.0099 | 0.0220 | 0.0017 | 0.0093 | 0.001 | 0.0013 | | 0.0008 | |
| Recovery of each rare earth | 0.073 | 0.142 | 0.141 | 0.170 | 0.095 | 0.041 | 0.124 | 0.065 | | 0.096 | | | | 0.168 | | a No data are available for Lu.

The recoveries of total REE, total LREE, and total HREE from the leachate were 0.131, 0.133, and 0.078, respectively. Without fluorine capturing agent, rare earths cannot be recovered properly.

Example 2

This Example shows the effect of the amount of $SiO_2$ on the recovery of rare earths from Concentrate II. The FCA was $SiCl_4$, formed in situ by carbochlorination of $SiO_2$. The amount of $SiO_2$ was equivalent to 70% of the stoichiometric amount needed to completely react with the fluorine in the concentrate to form $SiF_4$.

The amount of Concentrate II was 21.82 g and that of $SiO_2$ was 3.18 g. After carbochlorination, the amount of calcine was 66.25 g, and after aqueous leaching of the calcine with dilute HCl solution, the amount of dried solid residue was 46.31 g. Fluorine comprised 0.82 wt % of the dried solid residue.

The experimental results are summarized in Table 7.

TABLE 7

Recovery of rare earths after carbochlorination pretreatment and aqueous leaching of the calcine with dilute HCl solution

| Rare earths | Y | La | Ce | Pr | Nd | Sm | Eu | Gd | Tb | Dy | Ho | Er | Tm | Yb | Lu |
|---|---|---|---|---|---|---|---|---|---|---|---|---|---|---|---|
| Content in concentrate, wt % | 0.132 | 3.53 | 6.29 | 0.620 | 2.10 | 0.256 | 0.056 | 0.128 | 0.012 | 0.045 | 0.005 | 0.010 | 0.001 | 0.005 | 0.0006 |
| Content in residue, wt % | 0.021 | 0.047 | 0.115 | 0.016 | 0.074 | 0.015 | 0.004 | 0.012 | 0.001 | 0.006 | <0.001 | 0.002 | <0.001 | <0.001 | a |
| Amount | $W_{concentrate}$ = 21.82 g, $W_{residue}$ = 46.31 g | | | | | | | | | | | | | | |
| Amount in feed material, g | 0.029 | 0.770 | 1.372 | 0.135 | 0.458 | 0.056 | 0.012 | 0.028 | 0.003 | 0.010 | 0.001 | 0.002 | 0.0002 | 0.001 | 0.0001 |
| Amount in solid residue, g | 0.010 | 0.022 | 0.053 | 0.007 | 0.034 | 0.007 | 0.002 | 0.006 | 0.0005 | 0.003 | | 0.001 | | | |
| Recovery of each rare earth | 0.662 | 0.972 | 0.961 | 0.945 | 0.925 | 0.876 | 0.847 | 0.801 | 0.829 | 0.715 | | 0.588 | | | | a No data are available for Lu.

The recoveries of total REE, total LREE, and total HREE from the leachate were 0.950, 0.956, and 0.753, respectively.

Example 3

This Example is similar to Example 2, except that Concentrate I was used instead of Concentrate II, and the amount of $SiO_2$ was increased to 85% of the stoichiometric requirement for reacting with the fluorine in the concentrate to form $SiF_4$.

The amount of Concentrate I was 21.37 g and that of $SiO_2$ was 3.63 g. After carbochlorination and aqueous leaching, the amounts of calcine and dried solid residue were 67.02 g and 43.81 g, respectively. Fluorine comprised 0.87 wt % of the dried solid residue.

The experimental results are summarized in Table 8.

TABLE 8

Recovery of rare earths after carbochlorination pretreatment and aqueous leaching of the calcine with dilute HCl solution

| Rare earths | Y | La | Ce | Pr | Nd | Sm | Eu | Gd | Tb | Dy | Ho | Er | Tm | Yb | Lu |
|---|---|---|---|---|---|---|---|---|---|---|---|---|---|---|---|
| Content in concentrate, wt % | 0.120 | 2.26 | 4.15 | 0.431 | 1.36 | 0.16 | 0.045 | 0.094 | 0.006 | 0.041 | 0.004 | 0.005 | <0.001 | 0.004 | a |
| Content in residue, wt % | 0.027 | 0.017 | 0.054 | 0.008 | 0.034 | 0.011 | 0.003 | 0.011 | 0.001 | 0.007 | <0.001 | 0.002 | <0.001 | 0.001 | a |
| Amount | | | | | | $W_{concentrate}$ = 21.37 g, $W_{residue}$ = 43.81 g | | | | | | | | | |
| Amount in feed material, g | 0.026 | 0.483 | 0.887 | 0.092 | 0.291 | 0.034 | 0.010 | 0.020 | 0.001 | 0.009 | 0.001 | 0.001 | | 0.001 | |
| Amount in solid residue, g | 0.012 | 0.007 | 0.024 | 0.004 | 0.015 | 0.005 | 0.001 | 0.005 | 0.0004 | 0.003 | | 0.001 | | 0.0004 | |
| Recovery of each rare earth | 0.539 | 0.985 | 0.973 | 0.962 | 0.949 | 0.859 | 0.863 | 0.760 | 0.658 | 0.650 | | 0.180 | | 0.487 | | a No data are available for Lu.

The recoveries of total REE, total LREE, and total HREE, from the leachate were 0.958, 0.970, and 0.666, respectively.

Example 4

This Example is similar to Example 3, except that the amount of $SiO_2$ was increased to 100% of the stoichiometric requirement for reacting with the fluorine in the concentrate to form $SiF_4$.

The amount of Concentrate I and that of $SiO_2$ were 20.83 g and 4.17 g, respectively. The amount of the carbochlorination calcine and that of the dried solid residue after aqueous leaching were 66.91 g and 43.46 g, respectively. Fluorine comprised 0.65 wt % of the dried solid residue.

The experimental results are summarized in Table 9.

TABLE 9

Recovery of rare earths after carbochlorination pretreatment and aqueous leaching of the calcine with dilute HCl solution

| Rare earths | Y | La | Ce | Pr | Nd | Sm | Eu | Gd | Tb | Dy | Ho | Er | Tm | Yb | Lu |
|---|---|---|---|---|---|---|---|---|---|---|---|---|---|---|---|
| Content in concentrate, wt % | 0.120 | 2.26 | 4.15 | 0.431 | 1.36 | 0.16 | 0.045 | 0.094 | 0.006 | 0.041 | 0.004 | 0.005 | 0.001 | 0.004 | a |
| Content in residue, wt % | 0.023 | 0.01 | 0.027 | 0.004 | 0.02 | 0.007 | 0.002 | 0.008 | 0.001 | 0.006 | <0.001 | 0.002 | <0.001 | 0.001 | a |
| Amount | | | | | | $W_{concentrate}$ = 20.83 g, $W_{residue}$ = 43.46 g | | | | | | | | | |
| Amount in feed material, g | 0.025 | 0.471 | 0.864 | 0.0898 | 0.283 | 0.033 | 0.009 | 0.020 | 0.001 | 0.009 | 0.001 | 0.001 | 0.0002 | 0.001 | |
| Amount in solid residue, g | 0.010 | 0.004 | 0.012 | 0.002 | 0.007 | 0.003 | 0.0009 | 0.003 | 0.0004 | 0.003 | | 0.0009 | | 0.0004 | |
| Recovery of each rare earth | 0.600 | 0.991 | 0.986 | 0.981 | 0.975 | 0.909 | 0.907 | 0.822 | 0.652 | 0.695 | | 0.165 | | 0.478 | | a No data are available for Lu.

The recoveries of total REE, total LREE, and total HREE from the leachate were 0.974, 0.984, and 0.720, respectively.

Example 5

This example confirmed the feasibility of using flotation tails containing silicates as the supplier of FCA during the carbochlorination of Concentrate II.

The chemical composition of the flotation tails is listed in Table 10.

TABLE 10

Chemical composition of the flotation tails

| | Element | | | | | | | | | | |
|---|---|---|---|---|---|---|---|---|---|---|---|
| | Be | F | Na | Mg | Al | Si | P | K | Ca | Sc | Ti |
| Content, wt % | 0.002 | 1.27 | 0.06 | 18.9 | 0.249 | 8.81 | 0.205 | 0.307 | 13.8 | 0.003 | 0.212 |

| | Element | | | | | | | |
|---|---|---|---|---|---|---|---|---|
| | V | Mn | Fe | Zn | Ga | As | Sr | Y | Zr |
| Content, wt % | 0.008 | 1.11 | 8.32 | 0.079 | 0.002 | 0.002 | 0.171 | 0.016 | 0.004 |

TABLE 10-continued

Chemical composition of the flotation tails

| | Element | | | | | | | | | | |
|---|---|---|---|---|---|---|---|---|---|---|---|
| | Nb | Sn | Ba | La | Ce | Pr | Nd | Sm | Eu | Gd | Tb |
| Content, wt % | 0.034 | 0.002 | 0.077 | 0.183 | 0.332 | 0.035 | 0.118 | 0.016 | 0.004 | 0.008 | 0.001 |

| | Element | | | | | | | |
|---|---|---|---|---|---|---|---|---|
| | Dy | Ho | Er | Tm | Yb | Lu | Pb | Th | U |
| Content, wt % | 0.004 | 0.0007 | 0.002 | 0.0002 | 0.0009 | 0.0001 | 0.006 | 0.016 | 0.0003 |

The amounts of Concentrate II (11.65 g) and the flotation tails (13.35 g) were determined by assuming that the F:Si molar ratio introduced by both the concentrate and the flotation tails was equal to the stoichiometric requirement. After carbochlorination, 65.31 g calcine was obtained and after leaching with dilute HCl aqueous solution, 45.78 g dried solid residue was obtained.

The experimental results are summarized in Table 11.

TABLE 11

Recovery of rare earths from leachate after the carbochlorination pretreatment and aqueous leaching of the calcine with dilute HCl solution

| Rare earths | Y | La | Ce | Pr | Nd | Sm | Eu | Gd | Tb | Dy | Ho | Er | Tm | Yb | Lu |
|---|---|---|---|---|---|---|---|---|---|---|---|---|---|---|---|
| Content in concentrate, wt % | 0.132 | 3.53 | 6.29 | 0.620 | 2.10 | 0.256 | 0.056 | 0.128 | 0.012 | 0.045 | 0.005 | 0.010 | 0.001 | 0.005 | 0.0006 |
| Content in tail, wt % | 0.016 | 0.183 | 0.332 | 0.035 | 0.118 | 0.016 | 0.004 | 0.008 | 0.001 | 0.004 | 0.001 | 0.002 | 0.0002 | 0.001 | 0.0001 |
| Content in residue, wt % | 0.011 | 0.005 | 0.018 | 0.003 | 0.010 | 0.003 | <0.002 | 0.005 | <0.002 | 0.003 | <0.002 | <0.002 | <0.002 | <0.002 | a |
| Amount | | | | | | $W_{concentrate}$ = 11.65 g, $W_{tail}$ = 13.35 g, $W_{residue}$ = 45.78 g | | | | | | | | | |
| Amount in feed material, g | 0.017 | 0.436 | 0.777 | 0.077 | 0.260 | 0.032 | 0.007 | 0.016 | 0.002 | 0.006 | 0.0007 | 0.001 | 0.0001 | 0.0007 | 0.0001 |
| Amount in solid residue, g | 0.005 | 0.002 | 0.008 | 0.001 | 0.005 | 0.001 | | 0.002 | | 0.001 | | | | | |
| Recovery of each rare earth | 0.711 | 0.995 | 0.989 | 0.982 | 0.982 | 0.957 | | 0.856 | | 0.763 | | | | | | a No data are available for Lu.

The recoveries of total REE, total LREE, and total HREE from the leachate were 0.984, 0.989, and 0.829, respectively. This Example shows that rare earths can be effectively extracted by carbochlorination pretreatment of a mixture of rare earth concentrate and flotation tails with a preselected mass ratio.

Example 6

In this Example, a rare earth head was directly chlorinated. Diatomaceous earth was used to provide extra silicon to form $SiCl_4$, preventing the formation of rare earth fluorides during the carbochlorination.

The chemical composition of the rare earth head and that of diatomaceous earth are listed in Tables 12 and 13, respectively.

TABLE 12

Chemical composition of rare earth head

| Element | | | | | | | | | | | | | | | |
|---|---|---|---|---|---|---|---|---|---|---|---|---|---|---|---|
| C | F | Be | Na | Mg | Al | Si | P | K | Ca | Sc | Ti | Mn | Fe | Y | Zr |
| Content, wt % | | | | | | | | | | | | | | | |
| 9.97 | 3.98 | 0.002 | 0.022 | 7.79 | 0.042 | 0.580 | 0.436 | 0.042 | 19.1 | 0.005 | 0.164 | 1.19 | 8.25 | 0.038 | 0.005 |

| Element | | | | | | | | | | | | | | | |
|---|---|---|---|---|---|---|---|---|---|---|---|---|---|---|---|
| Nb | La | Ce | Pr | Nd | Sm | Eu | Gd | Tb | Dy | Ho | Er | Tm | Yb | Lu | Th |
| Content, wt % | | | | | | | | | | | | | | | |
| 0.095 | 0.323 | 0.604 | 0.059 | 0.208 | 0.030 | 0.007 | 0.017 | 0.002 | 0.009 | 0.001 | 0.003 | 0.0003 | 0.002 | 0.0003 | 0.036 |

TABLE 13

Chemical composition of diatomaceous earth

| Element | | | | | | | | | | | |
|---|---|---|---|---|---|---|---|---|---|---|---|
| Al | Ca | Fe | K | Mg | Mn | Na | P | Si | Ti | V |
| Content, wt % | | | | | | | | | | | |
| 1.37 | 0.33 | 0.76 | 0.15 | 0.23 | 0.03 | 3.13 | 0.01 | 42.0 | 0.08 | 0.01 |

The amount of the rare earth head was 25 g and that of diatomaceous earth was 1 g. The total silicon introduced by both the rare earth head and the diatomaceous earth was 110% of the stoichiometric amount needed for completely reacting with the fluorine in the system to form $SiF_4$. The amount of calcine after carbochlorination was 65.35 g, and the amount of dried solid residue after aqueous leaching with dilute HCl solution was 42.96 g.

The experimental results are summarized in Table 14.

TABLE 14

Recovery of rare earths from leachate after carbochlorination pretreatment and aqueous leaching of the calcine with dilute HCl solution

| Rare earths | Y | La | Ce | Pr | Nd | Sm | Eu | Gd | Tb | Dy | Ho | Er | Tm | Yb | Lu |
|---|---|---|---|---|---|---|---|---|---|---|---|---|---|---|---|
| Content in rare earth head, wt % | 0.038 | 0.323 | 0.604 | 0.059 | 0.208 | 0.030 | 0.007 | 0.017 | 0.002 | 0.009 | 0.001 | 0.003 | 0.0003 | 0.002 | 0.0003 |
| Content in residue, wt % | 0.007 | 0.004 | 0.018 | 0.002 | 0.007 | 0.002 | <0.002 | <0.002 | <0.002 | <0.002 | <0.002 | <0.002 | <0.002 | <0.002 | a |
| Amount | $W_{rare\ earth\ head}$ = 25.0 g, $W_{residue}$ = 42.96 g | | | | | | | | | | | | | | |
| Amount in feed material, g | 0.009 | 0.081 | 0.151 | 0.015 | 0.052 | 0.008 | 0.002 | 0.004 | 0.001 | 0.002 | 0.0003 | 0.001 | 0.0001 | 0.0005 | 0.0001 |
| Amount in solid residue, g | 0.003 | 0.002 | 0.008 | 0.001 | 0.003 | 0.001 | | | | | | | | | |
| Recovery of each rare earth | 0.683 | 0.979 | 0.949 | 0.941 | 0.942 | 0.887 | | | | | | | | | | a No data are available for Lu.

The recoveries of total REE, total LREE, and total HREE from the leachate were 0.947, 0.954, and 0.850, respectively.

Example 7

In this Example, $MgCl_2$ formed in situ from carbochlorination of MgO was used to prevent the formation of rare earth fluorides. The amount of MgO was selected to provide the stoichiometric amount of magnesium to form $MgF_2$ with the fluorine contained in Concentrate I.

The amount of Concentrate I was 16.81 g and that of MgO was 4.47 g. After carbochlorination and aqueous leaching, the amount of calcine and that of dried solid residue were 53.17 g and 33.76 g, respectively. Fluorine comprised 8.92 wt % of the dried solid residue.

The experimental results are summarized in Table 15.

TABLE 15

Recovery of rare earths from leachate after carbochlorination pretreatment and aqueous leaching of the calcine with dilute HCl solution

| Rare earths | Y | La | Ce | Pr | Nd | Sm | Eu | Gd | Tb | Dy | Ho | Er | Tm | Yb | Lu |
|---|---|---|---|---|---|---|---|---|---|---|---|---|---|---|---|
| Content in concentrate, wt % | 0.120 | 2.26 | 4.15 | 0.431 | 1.36 | 0.160 | 0.045 | 0.094 | 0.006 | 0.041 | 0.004 | 0.005 | 0.001 | 0.004 | a |
| Content in residue, wt % | 0.021 | 0.007 | 0.023 | 0.004 | 0.017 | 0.008 | 0.003 | 0.009 | 0.001 | 0.006 | <0.001 | 0.002 | <0.001 | 0.001 | a |
| Amount | $W_{concentrate}$ = 16.81 g, $W_{residue}$ = 33.76 g | | | | | | | | | | | | | | |
| Amount in feed material, g | 0.020 | 0.380 | 0.698 | 0.072 | 0.229 | 0.027 | 0.008 | 0.016 | 0.001 | 0.007 | 0.001 | 0.001 | 0.0002 | 0.001 | |
| Amount in solid residue, g | 0.007 | 0.002 | 0.008 | 0.001 | 0.006 | 0.003 | 0.001 | 0.003 | 0.0003 | 0.002 | | 0.001 | | 0.0003 | |
| Recovery of each rare earth | 0.649 | 0.994 | 0.989 | 0.981 | 0.975 | 0.900 | 0.866 | 0.808 | 0.665 | 0.706 | | 0.197 | | 0.498 | | a No data are available for Lu.

The recoveries of total REE, total LREE, and total HREE from the leachate were 0.976, 0.986, and 0.730, respectively.

Example 8

In this Example, a rare earth concentrate powder was coated with $Mg(OH)_2$ prior to the carbochlorination. First, 150 g $MgCl_2.6H_2O$ was dissolved into 100 mL deionized water to prepare a $MgCl_2$ aqueous solution. 25 g of the rare earth concentrate powder was then uniformly dispersed into the $MgCl_2$ solution. The pH of the solution was adjusted to greater than 9 by dissolving NaOH in the $MgCl_2$ solution, causing precipitation of $Mg(OH)_2$ onto the surface of the concentrate powder. After filtering, the filter cake was dried overnight at 105° C.

The chemical composition of the pretreated rare earth concentrate is listed in Table 16.

TABLE 16

Chemical composition of the pretreated rare earth concentrate

| | Element | | | | | | | | | | | | | | |
|---|---|---|---|---|---|---|---|---|---|---|---|---|---|---|---|
| | C | F | Be | Na | Mg | Al | Si | P | K | Ca | Sc | Ti | Mn | Fe | Y | Zr |
| Content, wt % | a | 8.86 | <0.01 | 3.24 | 18.6 | 0.030 | 0.130 | 1.27 | 0.020 | 12.9 | 0.001 | 0.030 | 0.168 | 1.07 | 0.051 | 0.003 |

| | Element | | | | | | | | | | | | | | |
|---|---|---|---|---|---|---|---|---|---|---|---|---|---|---|---|
| | Nb | La | Ce | Pr | Nd | Sm | Eu | Gd | Tb | Dy | Ho | Er | Tm | Yb | Lu | Th |
| Content, wt % | 0.095 | 0.323 | 0.604 | 0.059 | 0.208 | 0.030 | 0.007 | 0.017 | 0.002 | 0.009 | 0.001 | 0.003 | 0.0003 | 0.002 | 0.0003 | 0.036 | a Did not analyze.

The amount of the pretreated concentrate was 25 g. According to the analyses of F and Mg in the pretreated concentrate, the amount of Mg was 330% of the stoichiometric amount needed to form $MgF_2$. After carbochlorination and aqueous leaching, 71.02 g calcine and 45.32 g dried solid residue were obtained. Fluorine comprised 5.11 wt % of the dried solid residue.

The recovery of rare earths from leachate after carbochlorination and aqueous leaching is summarized in Table 17.

TABLE 17

Recovery of rare earths from leachate after carbochlorination pretreatment and aqueous leaching of the calcine with dilute HCl solution

| Rare earths | Y | La | Ce | Pr | Nd | Sm | Eu | Gd | Tb | Dy | Ho | Er | Tm | Yb | Lu |
|---|---|---|---|---|---|---|---|---|---|---|---|---|---|---|---|
| Content in concentrate, wt % | 0.051 | 0.919 | 1.65 | 0.172 | 0.563 | 0.063 | 0.018 | 0.040 | 0.003 | 0.017 | 0.001 | 0.003 | <0.001 | 0.002 | a |
| Content in residue, wt % | 0.002 | 0.003 | 0.008 | 0.002 | 0.003 | 0.002 | <0.001 | 0.002 | <0.001 | <0.001 | <0.001 | <0.001 | <0.001 | <0.001 | a |
| Amount | $W_{concentrate}$ = 25 g, $W_{residue}$ = 45.32 g | | | | | | | | | | | | | | |
| Amount in feed material, g | 0.013 | 0.230 | 0.413 | 0.043 | 0.141 | 0.016 | 0.005 | 0.010 | 0.001 | 0.004 | 0.0003 | 0.001 | | 0.001 | |
| Amount in solid residue, g | 0.001 | 0.001 | 0.004 | 0.001 | 0.001 | 0.001 | | 0.001 | | | | | | | |
| Recovery of each rare earth | 0.929 | 0.994 | 0.991 | 0.979 | 0.990 | 0.942 | | 0.909 | | | | | | | | a No data are available for Lu.

The recoveries of total REE, total LREE, and total HREE from the leachate were 0.989, 0.990, and 0.946, respectively.

Example 9

This Example shows the results of direct carbochlorination of Concentrate III and illustrates the feasibility of extracting zirconium, hafnium, niobium, and tantalum from gaseous products after carbochlorination, as well as recovering rare earths from the leachate after leaching the carbochlorination calcine with dilute HCl aqueous solution.

The amount of concentrate was 11.59 g and that of petroleum coke was 18.54 g. The reaction temperature was 800° C. After carbochlorination, 24.18 g calcine was produced, and after aqueous leaching with dilute HCl aqueous solution (pH 1.0), 19.19 g dried solid residue was obtained.

The experimental results are summarized in Table 18.

TABLE 18

Experimental results after carbochlorination of concentrate III and aqueous leaching of the carbochlorination calcine

| Element | Y | Zr | Nb | La | Ce | Pr | Nd | Sm | Eu | Gd | Tb |
|---|---|---|---|---|---|---|---|---|---|---|---|
| Content in concentrate, wt % | 0.915 | 13.6 | 1.25 | 1.12 | 2.46 | 0.318 | 1.32 | 0.305 | 0.037 | 0.270 | 0.043 |
| Content in residue, wt % | 0.092 | 0.867 | 0.023 | 0.007 | 0.022 | 0.003 | 0.020 | 0.010 | <0.002 | 0.014 | 0.002 |
| Amount | $W_{concentrate}$ = 11.59 g, $W_{residue}$ = 19.19 g | | | | | | | | | | |
| Amount in feed material, g | 0.106 | 1.58 | 0.145 | 0.130 | 0.285 | 0.037 | 0.153 | 0.035 | 0.004 | 0.031 | 0.005 |
| Amount in solid residue, g | 0.018 | 0.166 | 0.004 | 0.001 | 0.004 | 0.001 | 0.004 | 0.002 | | 0.003 | 0.0004 |
| Chlorination conversion/Recovery | 0.834 | 0.895 | 0.970 | 0.990 | 0.985 | 0.984 | 0.975 | 0.946 | | 0.914 | 0.923 |

| Element | Dy | Ho | Er | Tm | Yb | Lu | Hf | Ta |
|---|---|---|---|---|---|---|---|---|
| Content in concentrate, wt % | 0.237 | 0.041 | 0.104 | 0.013 | 0.079 | 0.010 | 0.233 | 0.121 |
| Content in residue, wt % | 0.016 | 0.003 | 0.012 | <0.001 | 0.010 | 0.001 | 0.020 | <0.01 |
| Amount | $W_{concentrate}$ = 11.59 g, $W_{residue}$ = 19.19 g | | | | | | | |
| Amount in feed material, g | 0.027 | 0.005 | 0.012 | 0.002 | 0.009 | 0.001 | 0.027 | 0.014 |
| Amount in solid residue, g | 0.003 | 0.001 | 0.002 | | 0.002 | 0.0002 | 0.004 | |
| Chlorination conversion/Recovery | 0.888 | 0.878 | 0.809 | | 0.789 | 0.839 | 0.858 | |

The recoveries of total REE, total LREE, and total HREE from the leachate were 0.952, 0.981, and 0.858, respectively. The chlorination conversions of zirconium, hafnium, and niobium were 0.895, 0.858, and 0.970, respectively, and the tantalum content of the dried solid residue was below detectable limits.

Example 10

Similar to Example 9, this Example shows the results of the carbochlorination of Concentrate III and that of leaching of the carbochlorination calcine with dilute HCl aqueous solution.

Under conditions similar to those of Example 9, MgO was introduced into the system to generate $MgCl_2$ as the FCA. A mixture of 1.12 g MgO, 25 g concentrate and 40 g petroleum coke was chlorinated at 800° C. The amount of MgO was 150% of the stoichiometric requirement for forming $MgF_2$ with the fluorine introduced by the concentrate. After carbochlorination, 52.04 g calcine was produced, and after leaching the calcine with dilute HCl aqueous solution (pH 1.0), 39.57 g dried solid residue was obtained.

The experimental results are summarized in Table 19.

TABLE 19

Experimental results after carbochlorination of concentrate III and aqueous leaching of the carbochlorination calcine

| Element | Y | Zr | Nb | La | Ce | Pr | Nd | Sm | Eu | Gd | Tb |
|---|---|---|---|---|---|---|---|---|---|---|---|
| Content in concentrate, wt % | 0.915 | 13.6 | 1.25 | 1.12 | 2.46 | 0.318 | 1.32 | 0.305 | 0.037 | 0.270 | 0.043 |
| Content in residue, wt % | 0.054 | 0.158 | 0.010 | 0.004 | 0.013 | 0.002 | 0.012 | 0.005 | <0.002 | 0.007 | <0.002 |
| Amount | $W_{concentrate}$ = 25 g, $W_{residue}$ = 39.57 g | | | | | | | | | | |
| Amount in feed material, g | 0.229 | 3.41 | 0.313 | 0.280 | 0.615 | 0.080 | 0.330 | 0.076 | 0.009 | 0.068 | 0.011 |
| Amount in solid residue, g | 0.021 | 0.063 | 0.004 | 0.002 | 0.005 | 0.0008 | 0.005 | 0.002 |  | 0.003 |  |
| Chlorination conversion/Recovery | 0.907 | 0.982 | 0.987 | 0.994 | 0.992 | 0.990 | 0.986 | 0.974 |  | 0.959 |  |

| Element | Dy | Ho | Er | Tm | Yb | Lu | Hf | Ta |
|---|---|---|---|---|---|---|---|---|
| Content in concentrate, wt % | 0.237 | 0.041 | 0.104 | 0.013 | 0.079 | 0.010 | 0.233 | 0.121 |
| Content in residue, wt % | 0.009 | 0.002 | 0.006 | <0.002 | 0.006 | <0.001 | <0.01 | <0.02 |
| Amount | $W_{concentrate}$ = 25 g, $W_{residue}$ = 39.57 g | | | | | | | |
| Amount in feed material, g | 0.059 | 0.010 | 0.026 | 0.003 | 0.020 | 0.003 | 0.058 | 0.030 |
| Amount in solid residue, g | 0.004 | 0.0008 | 0.002 |  | 0.002 |  |  |  |
| Chlorination conversion/Recovery | 0.940 | 0.922 | 0.909 |  | 0.879 |  |  |  |

The recoveries of total REE, total LREE, and total HREE from the leachate were 0.974, 0.990 and 0.924, respectively. The chlorination conversions of zirconium and niobium were 0.982 and 0.987, respectively, and the hafnium and tantalum contents of the dried solid residue were below detectable limits.

The invention illustratively disclosed herein suitably may be practiced in the absence of any element which is not specifically disclosed herein. It is apparent to those skilled in the art, however, that many changes, variations, modifications, other uses, and applications of the invention are possible, and also changes, variations, modifications, other uses, and applications which do not depart from the spirit and scope of the invention are deemed to be covered by the invention, which is limited only by the claims which follow.

The foregoing discussion of the invention has been presented for purposes of illustration and description. The foregoing is not intended to limit the invention to the form or forms disclosed herein. In the foregoing Detailed Description of Certain Embodiments of the Invention, for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description of Certain Embodiments of the Invention, with each claim standing on its own as a separate preferred embodiment of the invention.

Moreover, though the description of the invention has included description of one or more embodiments and certain variations and modifications, other variations, combinations, and modifications are within the scope of the invention, e.g. as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, whether or not such alternate, interchangeable, and/or equivalent structures, functions, ranges, or steps are disclosed herein, and without intending to publicly dedicate any patentable subject matter.

The invention claimed is:

1. A method of recovering a mineral from a fluorine-containing ore or concentrate, the method comprising:

treating the fluorine-containing ore or concentrate by carbochlorination in the presence of a carbon-containing material and a fluorine capturing agent to form a mineral chloride and a treated ore or concentrate, wherein the fluorine capturing agent prevents formation of rare earth fluorides by forming a fluoride more thermodynamically stable than rare earth fluorides during carbochlorination;

contacting the treated ore or concentrate with a HCl leach solution to solubilize the mineral chloride in the leach solution; and recovering the mineral, wherein the mineral is selected from the group consisting of a rare earth mineral, a scandium mineral, a niobium mineral, a tantalum mineral, a zirconium mineral, a hafnium mineral, a titanium mineral, and combinations thereof, and wherein fluorides remaining in the treated ore or concentrate after the treating step are insoluble in the HCl leach solution.

2. The method of claim 1, wherein the fluorine capturing agent comprises at least one of magnesium chloride, silicon tetrachloride, and mixtures thereof.

3. The method of claim 2, wherein the fluorine capturing agent comprises at least one of (i) silicon tetrachloride formed in situ during the treating step by carbochlorination of silicon dioxide or silicates, and (ii) magnesium chloride formed in situ during the treating step by carbochlorination of at least one of magnesium oxide, magnesium hydroxide, and magnesium carbonate.

4. The method of claim 1, wherein the fluorine-containing ore or concentrate comprises at least one of monazite, bastnasite, pyrochlore, zircon, ilmenite, rutile, loparite, columbite, and tantalite.

5. The method of claim 1, wherein a weight ratio of the fluorine-containing ore or concentrate to the carbon-containing material is less than about 5:1.

6. The method of claim 1, wherein the treating step is performed for a time of between about two hours and about four hours.

7. The method of claim 1, wherein the treating step is performed at a temperature of between about 600° C. and about 1000° C.

8. The method of claim 1, wherein the mineral is recovered from the leach solution.

9. The method of claim 1, wherein the mineral is recovered from a gas phase.

10. The method of claim 1, wherein the carbon-containing material comprises at least one of coke, coal, biomass, and an organic compound.

11. A method of recovering a mineral comprising at least one of scandium, niobium, tantalum, zirconium, hafnium, titanium, and a rare earth element from a fluorine-containing ore or concentrate, comprising:
    (a) agglomerating the fluorine-containing ore or concentrate with a carbon-containing material, a fluorine capturing agent, and a binder to produce an agglomerate;
    (b) carbochlorinating the agglomerate by exposing the agglomerate to chlorine gas to produce a calcine;
    (c) leaching the calcine by contacting the calcine with a hydrochloric acid solution having a pH of less than about 4.0 to produce a mixture of a liquid and a solid; and
    (d) recovering the mineral by contacting the liquid of the mixture with at least one of sodium hydroxide, ammonium hydroxide and magnesium hydroxide,
    wherein the fluorine capturing agent prevents formation of rare earth fluorides throughout step (b).

12. The method of claim 11, wherein step (b) produces a gas, further comprising:
    (e) condensing the gas to produce at least one of condensed chlorides and oxychlorides; and
    (f) regenerating chlorine gas by exposing the at least one of chlorides and oxychlorides to an oxygen-containing gas.

13. The method of claim 12, wherein the chlorine gas regenerated in step (f) is at least part of the chlorine gas to which the agglomerate is exposed in step (b).

14. The method of claim 11, wherein the fluorine capturing agent comprises at least one of magnesium chloride, silicon tetrachloride, and mixtures thereof.

15. The method of claim 14, wherein the fluorine capturing agent comprises at least one of (i) silicon tetrachloride formed in situ during step (b) by carbochlorination of silicon dioxide or silicates, and (ii) magnesium chloride formed in situ during step (b) by carbochlorination of at least one of magnesium oxide, magnesium hydroxide, and magnesium carbonate.

16. The method of claim 11, wherein the fluorine-containing ore or concentrate comprises at least one of monazite, bastnasite, pyrochlore, zircon, ilmenite, rutile, loparite, columbite, and tantalite.

17. The method of claim 11, wherein a weight ratio of the ore or concentrate to the carbon-containing material is less than about 5:1.

18. The method of claim 11, wherein step (b) is performed for a time of between about two hours and about four hours.

19. The method of claim 11, wherein step (b) is performed at a temperature of between about 600° C. and about 1000° C.

20. The method of claim 11, wherein the carbon-containing material comprises at least one of coke, coal, biomass, and an organic compound.

21. A method of recovering a mineral from a fluorine-containing ore or concentrate, the method comprising:
    treating the fluorine-containing ore or concentrate by carbochlorination in the presence of a carbon-containing material and an fluorine capturing agent precursor to form a mineral chloride and a treated ore or concentrate, wherein a fluorine capturing agent is formed in situ by carbochlorination of the fluorine capturing agent precursor and the fluorine capturing agent prevents formation of rare earth fluorides by forming a fluoride more thermodynamically stable than rare earth fluorides during carbochlorination;
    contacting the treated ore or concentrate with a HCl leach solution to solubilize the mineral chloride in the leach solution; and
    recovering the mineral,
    wherein the mineral is selected from the group consisting of a rare earth mineral, a scandium mineral, a niobium mineral, a tantalum mineral, a zirconium mineral, a hafnium mineral, a titanium mineral, and combinations thereof, and
    wherein fluorides remaining in the treated ore or concentrate after the treating step are insoluble in the HCl leach solution.

* * * * *